United States Patent
Hollfelder

(10) Patent No.: US 6,558,087 B1
(45) Date of Patent: May 6, 2003

(54) MACHINING TOOL FOR HIGH-SPEED MACHINING

(76) Inventor: Hans-Peter Hollfelder, Lindenstrasse 27, D-90768, Fuerth (DE)

( * ) Notice: Subject to any disclaimer, the term of this patent is extended or adjusted under 35 U.S.C. 154(b) by 24 days.

(21) Appl. No.: 09/856,603

(22) PCT Filed: Sep. 23, 2000

(86) PCT No.: PCT/EP00/09314

§ 371 (c)(1),
(2), (4) Date: Jul. 6, 2001

(87) PCT Pub. No.: WO01/28718

PCT Pub. Date: Apr. 26, 2001

(30) Foreign Application Priority Data

Oct. 15, 1999 (DE) .......................................... 199 49 743

(51) Int. Cl.⁷ .......................... B23P 15/28; B23D 1/00; B26D 1/12
(52) U.S. Cl. ....................... 407/107; 407/109; 407/40; 407/104; 407/105; 407/110
(58) Field of Search .................. 407/44, 45, 72, 407/73, 77, 85, 86, 87, 92, 93

(56) References Cited

U.S. PATENT DOCUMENTS

| | | | |
|---|---|---|---|
| 3,815,195 A | * 6/1974 | McCreery | 407/105 |
| 4,213,358 A | * 7/1980 | Yascheritsyn et al. | 407/2 |
| 4,583,886 A | * 4/1986 | Drescher | 407/104 |
| 5,035,544 A | * 7/1991 | Ikenaga et al. | 407/105 |
| 5,100,268 A | * 3/1992 | Nakayama et al. | 407/104 |
| 5,899,643 A | * 5/1999 | Oehler | 407/107 |
| 5,975,811 A | * 11/1999 | Briese | 407/40 |
| 6,030,153 A | * 2/2000 | Votsch et al. | 407/36 |

* cited by examiner

*Primary Examiner*—A. L. Wellington
*Assistant Examiner*—Dana Ross
(74) *Attorney, Agent, or Firm*—Jordan and Hamburg LLP

(57) ABSTRACT

A machine tool, which is also suitable for high-speed machining in metal cutting, for which at least one cutting body is held by a clamping device in a plate seat of a tool holder, which is bounded only by a back pressure supporting surface and by a supporting surface, the supporting surface for the clamping device and the supporting surface of the plate seat enclosing an angle, which exceeds the automatic interlocking and opens up to the back pressure supporting surface, wherein the cutting body is provided with a groove, which is engaged by a sliding pin, the diameter of which corresponds essentially to the width of the groove and which is disposed eccentrically and parallel to the axis of rotation of the bearing bolt, which is mounted rotatably in a bearing opening of the tool holder, passing through the supporting surface and/or the back pressure supporting surface, and which can be actuated from the outside.

43 Claims, 7 Drawing Sheets

MACHINING TOOL FOR HIGH-SPEED MACHINING

BACKGROUND OF THE INVENTION

Figure 1:
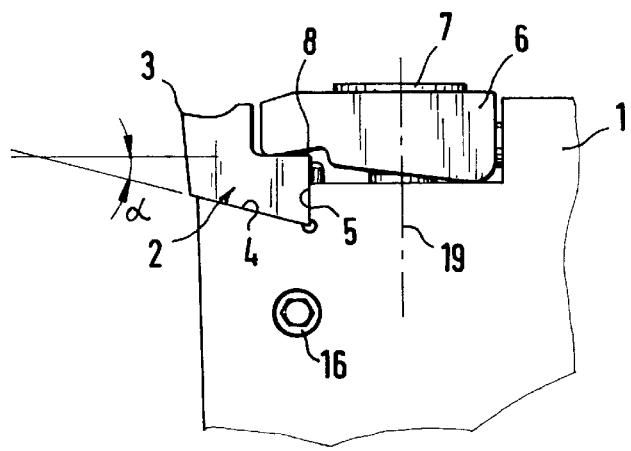

The invention relates to a machining tool, which is also suitable for high-speed machining in a metal cutting, for which at least one cutting body is held by a clamping organ in a plate seat of a tool holder, which is bounded only by a back pressure supporting surface and by a supporting surface, the supporting surface for the clamping organ and the supporting surface of the plate seat enclosing an angle, which exceeds the automatic interlocking and opens up to the back pressure supporting surface.

Different embodiments of such machining tools have already become known. In this connection, the basic aim has been to construct the tool of the fewest, self-secured components possible, which is necessary, for example, for high-speed processing.

The design always becomes a problem whenever very small tool dimensions are desired and when the cutting body is clamped instead of being soldered, so that it can simply be exchanged in case of need. In these cases (see, for example, Offenlegungschriften DE 33 43 448 A1 and DE 34 10 284 A1), exact positioning of the cutting body is required for metal cutting especially in the case of rotating processing machines, so that it very simply comes to be in precisely the same position once again even when exchanged or after wear. If a tool is to be created, which can be used on rotating processing machines in metal cutting for a large number of tasks, such as the cutting of annular grooves, the use with side milling cutters and circular milling cutters working on three sides, the end processing with integrated drills or multi-blade counterbores and drilling tools, reaming tools or the like, main and subsidiary cutting edges of the cutting body must come to lie freely in the plate seat of the tool and can automatically lie in contact only with the supporting surface and the back pressure supporting surface in the tool. All other sides must remain free. This, in turn, naturally makes the exact positioning in the longitudinal direction of the cutting edge more difficult.

SUMMARY OF THE INVENTION

It is therefore an object of the invention to configure a tool of the type named above in such a manner, that the cutting body can be shifted in the clamped state precisely adjustably on the plate seat.

Pursuant to the invention, this objective is accomplished owing to the fact that the cutting body is provided with a groove, which is engaged by a sliding pin, the diameter of which corresponds essentially to the width of the groove and which is disposed eccentrically and parallel to the axis of rotation of a bearing bolt, which is mounted rotatably in a bearing opening of the tool holder, passing through the supporting surface and/or the back pressure supporting surface, and which can be actuated from the outside.

The inventive construction results in an exact, locked coupling of the cutting body with the sliding pin, which is disposed eccentrically on a bearing bolt. If the bearing bolt is twisted about its longitudinal axis, the sliding pin, which is integrally molded or fastened to it eccentrically, shifts the cutting body into the one or the other direction parallel to the cutting edge. In this way, with the cutting body clamped within the scope of the eccentricity of the eccentric bolt, consisting of the bearing bolt and the sliding pin, the position of the cutting body on the plate seat can be changed and, on the other hand, this position can also be locked reproducibly in the set position by the sliding pin.

In a further development of the invention, it is possible to dispose the groove, which in this case is preferably bounded at both ends, in the bottom surface of the cutting body in contact with the supporting surface or, what is generally preferred because of the greater distance of the groove from the cutting edge and, with that, the higher load-carrying capability of the cutting body, to dispose the groove in the back surface of the cutting body, which lies in contact with the back pressure supporting surface. In this case, it can be constructed so as to be bounded at the top in order to increase the stability.

The axis of the bearing bolt advisably extends essentially parallel to the back pressure supporting surface of the tool in a plane, approximately perpendicular to the supporting surface. Due to the perpendicular position of the axis of rotation of the bearing bolt to the supporting surface, the sliding pin can dip completely into the groove. Preferably, the bearing bolt extends as far as directly below the supporting surface, so that an excessive bending stress on the sliding pin cannot occur during the twisting of the bearing bolt.

In order to hold the bearing bolt in the bearing opening so that it cannot be shifted axially but, nevertheless, can be rotated, provisions can be made in accordance with a further distinguishing feature of the invention so that the bearing bolt has an annular recessed groove, into which an axially delimiting pin protrudes. By unscrewing the axial delimiting pin, the bearing bolt, with the thereon adjoining eccentric sliding pin can very easily be removed upward or downward out of the tool holder.

To actuate the inventive, eccentric bolt, the bearing bolt, at its end remote from the sliding pin, may be provided with a hexagonal recess or the like for applying an actuating tool, such as a hexagonal sockethead cap wrench.

Aside from this construction of the bearing bolt as a smooth cylindrical pin (interrupted only by the annular insertion groove for the axial limitation), provisions can also be made so that the bearing bolt is constructed as a threaded bolt and its bearing opening is constructed in the tool holder as a borehole with an internal thread. In this case, also, an annular insertion groove may be provided, into which an axially delimiting pin protrudes. In this case, however, the width of the annular insertion groove must be larger than the diameter of the axially delimiting pin, in order to make possible an axial displacement of the threaded bolt corresponding to the axial clearance. The fact that, when the eccentric bolt is rotated, the sliding pin not only is rotated eccentrically with the bearing bolt, which is constructed as a threaded bolt, but also shifted in the axial direction, does not affect the adjustment of the cutting body, as long as it is ensured that the face end of the sliding pin cannot collide with an upper covering boundary of the groove.

In the case of the preferred construction of the clamping organ for holding the cutting body in its plate seat by a clamping action as a clamping shoe, provisions can be made in a further development of the invention so that the clamping shoe is provided at the end, remote from the plate seat, with a recess, which is engaged by a sliding locking pin, such as a lug, at the tool holder. This has the advantage that, when the cutting body is shifted in the plate seat, with the clamping shoe clamped tight, the clamping shoe is not swiveled along with the displacement of the cutting body and, instead, is held fast so that the clamping shoe must glide correspondingly over the supporting surface of the holder for the cutting blade.

Finally, it is also still within the scope of the invention to direct the axis of the clamping screw obliquely inwards into the tool holder. Especially for side milling cutters and circular milling cutters, this offers the advantage that a larger number of cutting bodies can be disposed at the periphery of the disk-shaped tool holder.

Further advantages, distinguishing features and details of the invention arise out the following description of an example, as well as out of the accompanying drawings.

IN THE DRAWINGS

Figure 2:
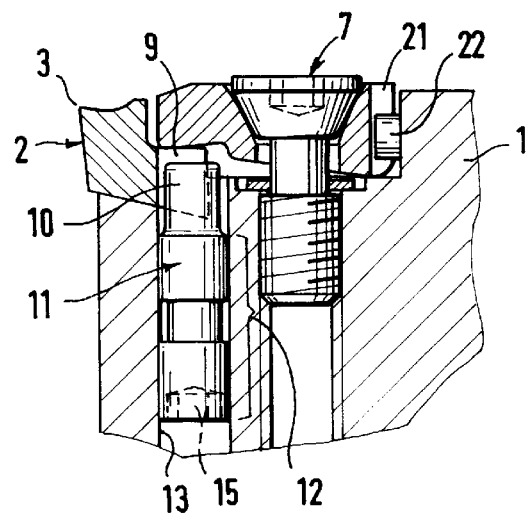
Figure 3:
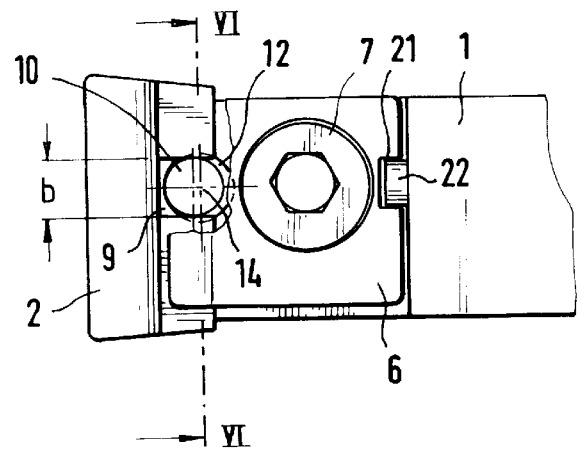
Figure 4:
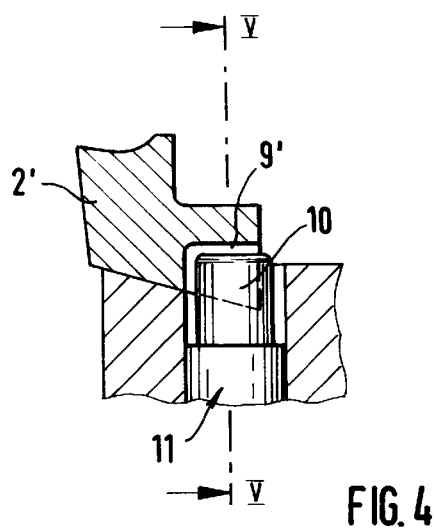
Figure 5:
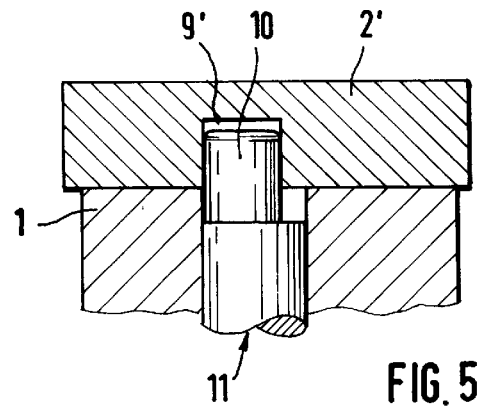
Figure 6:
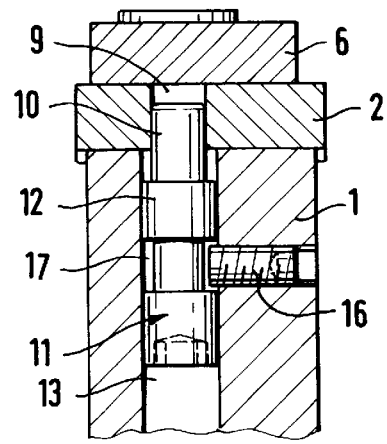
Figure 7:
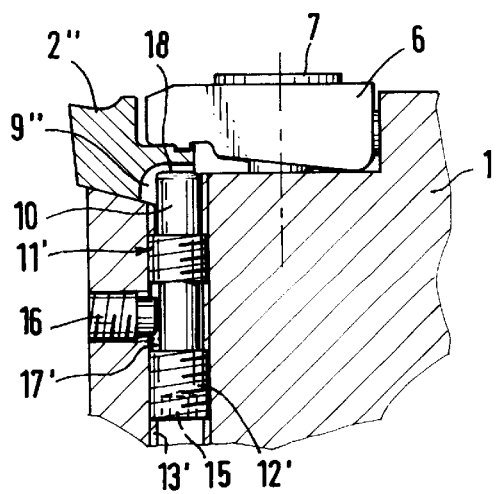
Figure 8:
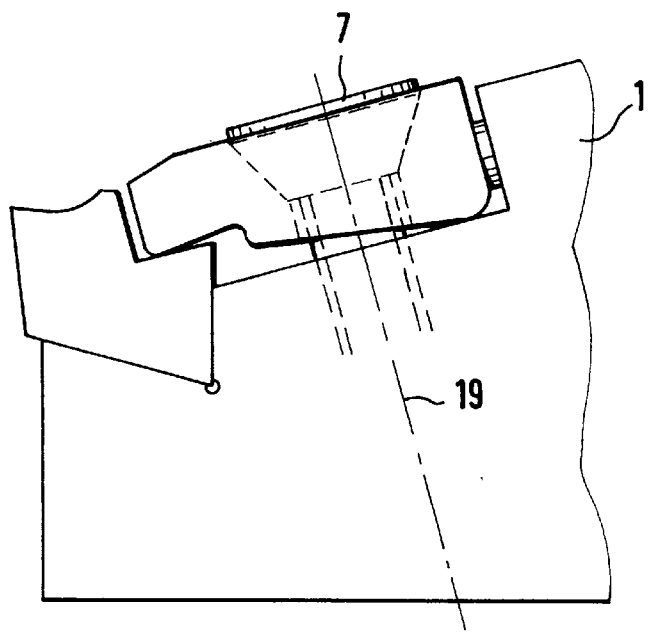
Figure 9:
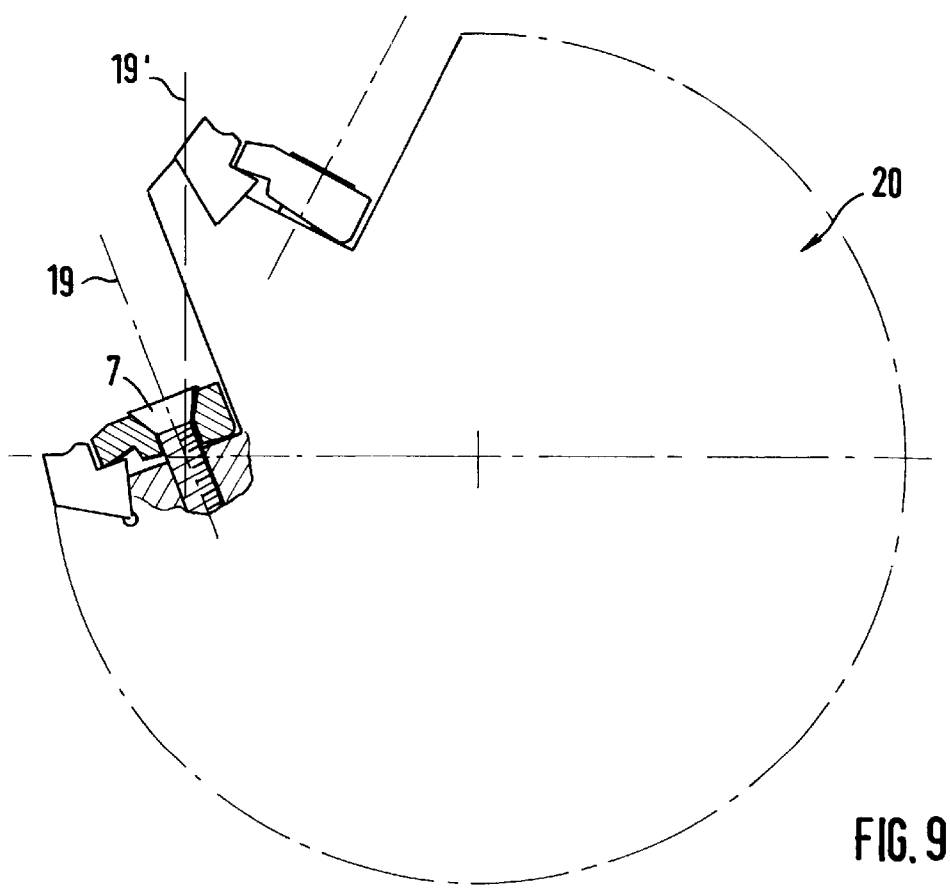
Figure 10:
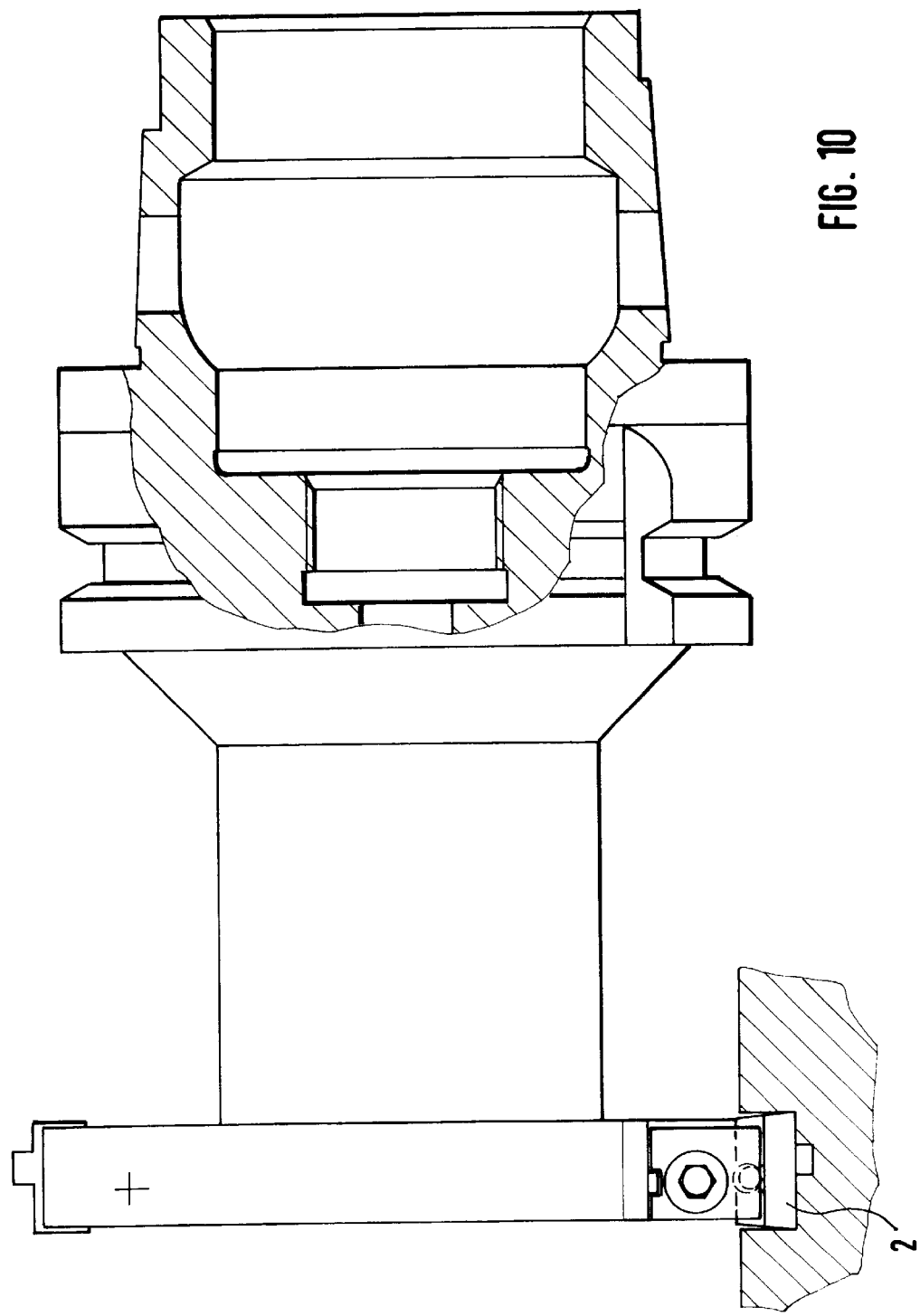
Figure 11:
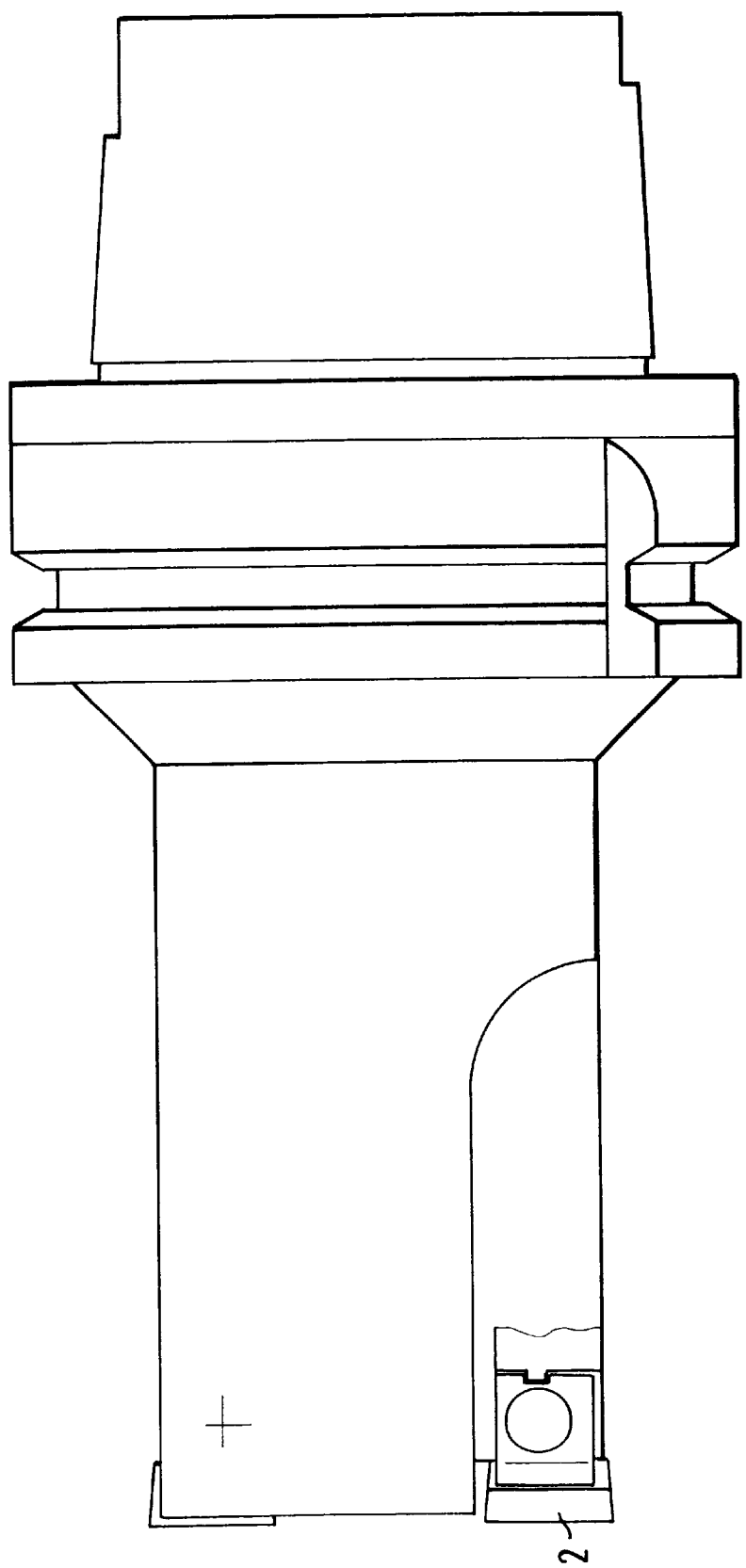
Figure 12:
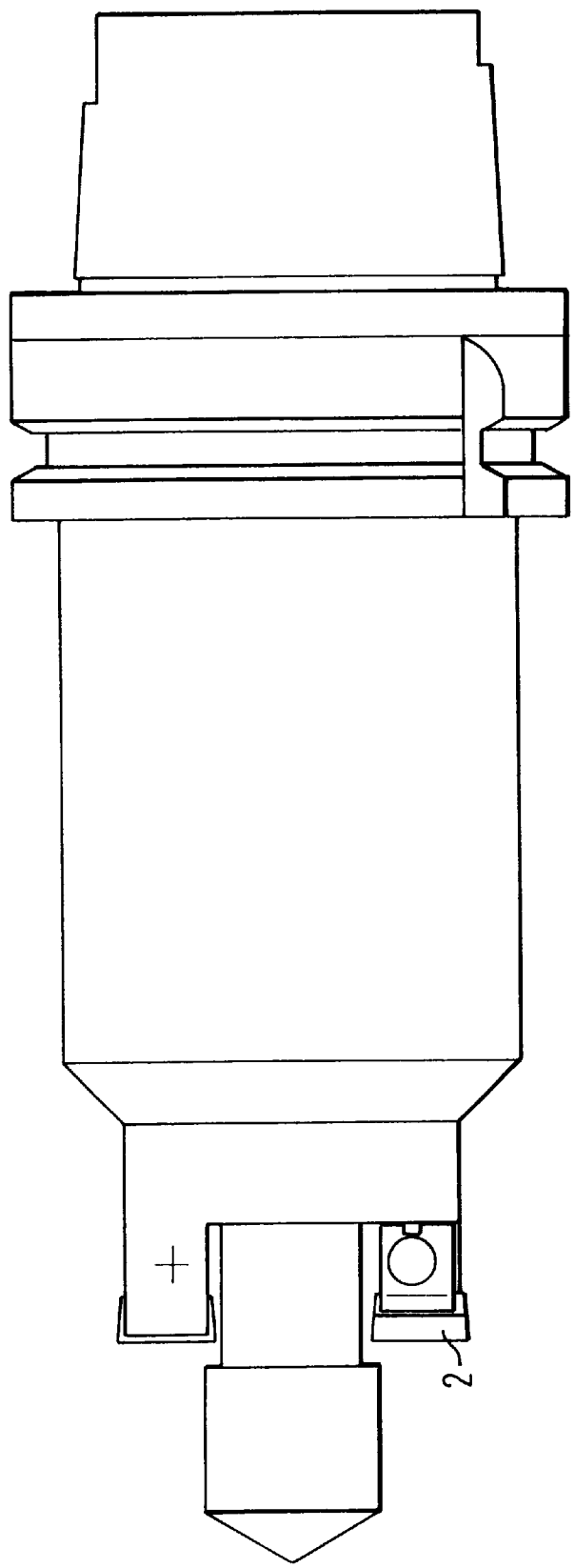
Figure 13:
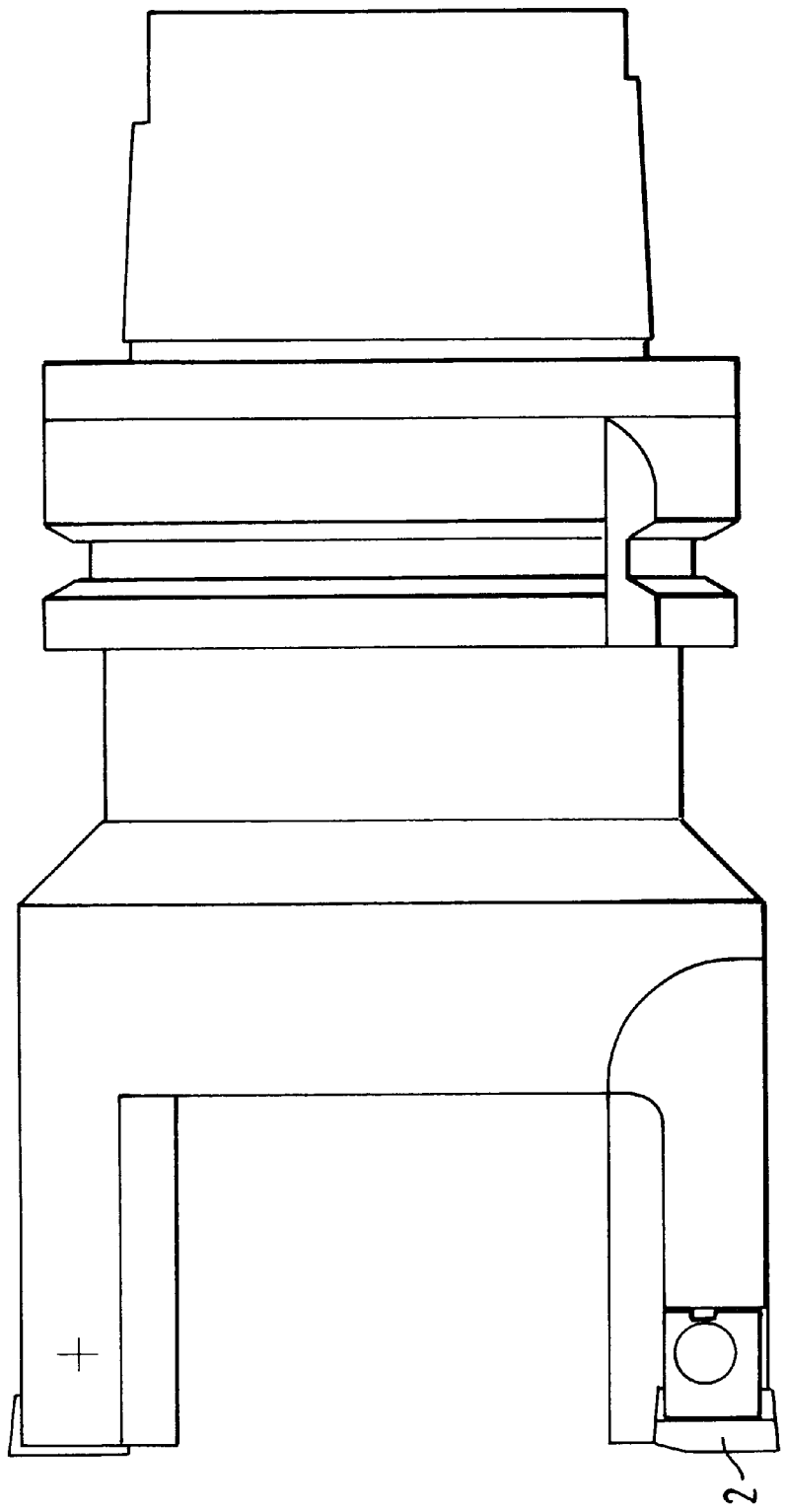

FIG. 1 shows a diagrammatic side view of the front end of an invented tool,

FIG. 2 shows a section, parallel to the plane of the drawing, through the tool of FIG. 1, FIG. 3 shows a plan view of the tool of FIGS. 1 and 2, FIG. 4 shows a partial section through a modified tool, for which the displacement groove in the cutting body is open downward and towards the back pressure supporting surface, but delimited upward, FIG. 5 shows a section along the line IV—IV in FIG. 4, FIG. 6 shows a section along the line VI—VI in FIG. 3, FIG. 7 shows a section, corresponding to that of FIG. 2, through a modified tool, for which the bearing pin of the eccentric bolt is constructed as a threaded bolt, FIG. 8 shows a diagrammatic side view of a modified tool corresponding to that of FIG. 1 with the axis of the clamping screw directed obliquely inwards into the tool holder, FIG. 9 shows a side milling cutter with a tool construction similar to that of FIG. 8, to illustrate the larger number of cutting bodies, which can be accommodated, FIG. 10 shows a side milling cutter, constructed pursuant to the invention with pattern plates and sectional division, FIG. 11 shows a counterbore, constructed pursuant to the invention, FIG. 12 shows an end processing tool with integrated drill, constructed, pursuant to the invention and FIG. 13 shows a front perforation tool constructed pursuant to the invention.

DESCRIPTION OF THE PREFERRED EMBODIMENTS

In the tool holder 1, a plate seat for holding a cutting tool 2 with a cutting blade 3 is constructed, which consists only of the supporting surface 4 and the back pressure supporting surface 5, against which the corresponding side surfaces of the cutting body 2 lie. All other sides are free, so that the cutting body 2, clamped by a clamping shoe 6 and a clamping screw 7, clamping the latter in the plate seat, is not supported towards the rear or the front perpendicularly to the plane of the drawing in FIG. 1. The angle α between the supporting surface 4 and the supporting surface 8 of the clamping shoe 6, which opens up towards the back pressure supported surface 5, is larger than the angle of automatic interlocking, so that the cutting body is pulled towards the rear into the plate seat by the pressure of the clamping shoe 6.

In the case of the example of FIGS. 1 to 3, the cutting body 2 is provided with a groove 9, which is continued from top to bottom and is engaged by an eccentric sliding pin 10 of an eccentric bolt 11. The bearing bolt 12 of this eccentric bolt 11 is mounted rotatably in a continuous cylindrical opening 13 of the tool holder 1. The diameter of the eccentric sliding pin 10, disposed parallel to the axis of rotation 14 of the bearing bolt 12 corresponds exactly to the width b of the groove 9 in the cutting body 2.

If the eccentric bolt 11 is rotated preferably by applying a hexagonal socket tool to the hexagonal recess 15 at the lower end of the bearing bolt, the sliding pin 10, which is seated eccentrically at the bearing bolt 12 and without clearance in the groove 9, shifts the cutting body 2 in the longitudinal direction of the main cutting edge 3. In practice, of course, the extent of the displacement generally is only a few tenths of a millimeter or less. This displaceability of the cutting tool with the help of the eccentric bolt 11 is, after all, only a fine adjustment of the position of the cutting body. The displacement of the cutting body 2 with the help of the eccentric bolt 11 can be brought about with the cutting body tightly clamped, that is, with the clamping screw 7 tightened.

FIGS. 4 and 5 show sections through a modified tool, for which the cutting body 2' has a groove 9', which is delimited upwards, for accommodating the sliding pin 10 of the threaded bolt 11.

FIG. 6 shows the axial delimiting pin 16, which engages an annular insertion groove 17 of the bearing section 12 of the eccentric bolt 11 and prevents the eccentric bolt 11 failing downwards out of the bearing opening 13. FIG. 7 shows a modified embodiment of an inventive tool, for which the eccentric bolt 11' is constructed as an threaded bolt.

In this case, therefore, the bearing section 12' is a threaded section, which is screwed into the opening 13' of the tool holder 1, which is also constructed as a borehole with an internal thread. The axially delimiting pin 16 in this case engages a wider annular insertion groove 17', so that the bearing section 12', constructed as a threaded bolt, can be displaced in the axial direction and consequently moved by rotation between two delimited end positions. At the same time, a movement of the eccentric sliding pin 10 takes place once again in the same manner, however, with the difference that the sliding pin 10 also moves upward and downward. For this reason, it must be made certain that, in the case of an upwardly delimited displacement groove 9" in the cutting body 2", as shown in FIG. 7, the upper front end 18 of the sliding pin 10 does not collide with the upper boundary of the groove 9".

In the case of the construction of an inventive tool shown in FIG. 8, the axis 19 of the clamping screw 7 is directed obliquely inward in the holder 1. As can be seen from FIG. 9, this has the advantage that a further cutting body can be mounted at the side milling cutter 20 at a smaller angular distance. If the position of the axis 19 of the clamping screw 7 were to be selected, as in the case of the preceding examples at 19', then this would mean that the next cutting body can only be disposed further to the right in order to ensure free accessibility to the clamping screw 7. Consequently, a fewer number of cutting bodies can be held at the periphery of the side milling cutter.

FIGS. 10 to 13 show different tools. It is a common feature of all of these tools that the cutting bodies 2 are clamped in the inventive manner in the plate seats of the respective tool holders, which are bounded on only two sides, that is, that the cutting bodies 2 can be shifted parallel to the cutting edge and locked with the help of an eccentric bolt.

What is claimed is:

1. A machining tool, comprising:

a tool holder having a bearing opening and a plate seat, said plate seat being bounded only by a back pressure supporting surface and a supporting surface;

a clamping mechanism;

a cutting body arranged to be held by said clamping mechanism in said plate seat of said tool holder, said cutting body having a back surface in contact with said back pressure supporting surface of said plate seat and including a groove arranged in said back surface, a sliding pin arranged to engage said groove, the diameter of said sliding pin corresponding essentially to a width of said groove, and a bearing bolt connected to said sliding pin, said sliding pin being arranged eccentrically and parallel to an axis of rotation of said bearing bolt, said bearing bolt being mounted rotatably in said bearing opening and said bearing opening being arranged to pass through at least one of said supporting surface and back pressure supporting surface and said bearing bolt being externally actuatable.

2. The tool of claim 1, wherein said cutting body includes a bottom surface in contact with said supporting surface of said plate seat, said groove being arranged at a corner of said cutting body such that said groove is arranged in both said back surface and said bottom surface of said cutting body.

3. The tool of claim 2, wherein said groove is bounded at both ends.

4. The tool of claim 1, wherein said groove is bounded in the upward direction.

5. The tool of claim 4, wherein the axis of said bearing bolt is parallel to said back pressure supporting surface in a plane perpendicular to said supporting surface.

6. The tool of one of the claims 1 to 5, wherein said bearing bolt has an annular insertion groove, further comprising an axially delimiting pin protruding into said annular insertion groove.

7. The tool of claim 6, wherein said bearing bolt includes an annular insertion groove, the width of which is larger than the diameter of said axially delimiting pin.

8. The tool of one of the claims of 1 to 5, wherein said bearing bolt, at an end remote from said sliding pin, is provided with a recess adapted to mate with an actuating tool.

9. The tool of claim 8, wherein said recess is hexagonal.

10. The tool of one of the claims 1 to 5, wherein said bearing bolt is constructed as a threaded bolt and said bearing opening is constructed as a borehole with an internal thread.

11. The tool of one of the claims of 1 to 5, wherein the clamping mechanism is a clamping shoe which is clampable by a clamping screw.

12. The tool of claim 11, wherein said clamping shoe is provided, at the end, remote from said plate seat, with a recess, further comprising a sliding pin on said tool holder for engaging said recess.

13. The tool of claim 11, wherein the axis of said clamping screw is directly obliquely inward into said tool holder.

14. A machining tool, comprising:

a tool holder having a bearing opening and a plate seat, said plate seat being defined only by a base support surface and a back-pressure support surface arranged at an angle to said base support surface, said bearing opening extending through at least said back-pressure support surface;

a cutting body clamped in said plate seat of said tool holder, said cutting body including a back surface in contact with said back-pressure support surface and a groove arranged in said back surface; and an eccentric bolt arranged in said bearing opening of said tool holder and including a rotatable bearing bolt and a sliding pin arranged eccentrically and parallel to an axis of rotation of said bearing bolt, said sliding pin being arranged at least partially in said groove and to move upon rotation of said bearing bolt to thereby change a position of said cutting body.

15. The tool of claim 14, wherein said groove of said cutting body extends from a bottom surface of said cutting body to a top surface of said cutting body.

16. The tool of claim 14, wherein said groove of said cutting body extends from a bottom surface of said cutting body only partially toward a top surface of said cutting body such that movement of said sliding pin into said groove is limited.

17. The tool of claim 14, wherein said bearing opening also extends through said base support surface and said groove of said cutting body is arranged at a corner of a bottom surface of said cutting body in contact with said base support surface and said back surface of said cutting body in contact with said back-pressure support surface.

18. The tool of claim 14, wherein the axis of said bearing bolt is substantially parallel to said back-pressure supporting surface.

19. The tool of claim 14, wherein said bearing opening extends through said tool holder such that said eccentric bolt is adjustable from an exterior of said tool holder.

20. The tool of claim 14, comprising clamping means for clamping said cutting body in said plate seat of said tool holder.

21. The tool of claim 20, wherein said base support surface is arranged at an angle to a support surface of said clamping means in contact with said cutting body such that said cutting body is urged rearward into said plate seat by said clamping means.

22. The tool of claim 20, wherein said clamping means comprise a clamping shoe arranged to engage said cutting body and a clamping screw for attaching said clamping shoe to said tool holder.

23. The tool of claim 22, wherein said clamping shoe has a first side adjacent said plate seat and a second, opposite side, said clamping shoe having a recess at said second side, further comprising a sliding pin arranged to lie in said recess to thereby enable the position of said clamping shoe to be fixed.

24. The tool of claim 22, wherein said clamping screw is arranged such that an axis of said clamping screw is directed obliquely inward into said tool holder.

25. The tool of claim 14, wherein said bearing bolt has an annular insertion groove and is movable in a longitudinal direction of said bearing opening, further comprising a pin arranged to pass into said annular insertion groove and thereby limit movement of said bearing bolt.

26. The tool of claim 14, wherein said sliding pin is arranged on one end of said bearing bolt and said bearing bolt includes a recess at an opposite end adapted to mate with a tool to thereby enable displacement of said bearing bolt.

27. The tool of claims 14, wherein said bearing bolt is threaded and said bearing opening has an internal thread corresponding to the thread of said bearing bolt.

28. The tool of claim 27, wherein said bearing bolt has an annular insertion groove and is movable in a longitudinal direction of said bearing opening upon rotation of said eccentric bolt, further comprising a pin arranged to pass into said annular insertion groove and thereby limit movement of said bearing bolt, said annular insertion groove having a width larger than a diameter of said pin.

29. The tool of claim 14, wherein said sliding pin has a diameter equal to a width of said groove.

30. A machining tool, comprising:
a tool holder having a plate seat defined only by a base support surface and a back-pressure support surface arranged at an angle to said base support surface;
a cutting body clamped in said plate seat of said tool holder, said cutting body including a back surface in contact with said back-pressure support surface of said plate seat; and
adjustment means for enabling the position of said cutting body to be adjusted while said cutting body is clamped, said adjustment means comprising a bearing opening arranged in said tool holder, a groove arranged in said back surface of said cutting body, and an eccentric bolt arranged in said bearing opening of said tool holder and including a rotatable bearing bolt and a sliding pin arranged eccentrically and parallel to an axis of rotation of said bearing bolt, said sliding pin being arranged at least partially in said groove and to move upon rotation of said bearing bolt to thereby change the position of said cutting body, said bearing opening extending through at least said back-pressure support surface of said plate seat.

31. The tool of claim 30, wherein said adjustment means comprise a bearing opening arranged in said tool holder, a groove arranged in said cutting body, and an eccentric bolt arranged in said bearing opening of said tool holder and including a rotatable bearing bolt and a sliding pin arranged eccentrically and parallel to an axis of rotation of said bearing bolt, said sliding pin being arranged at least partially in said groove and to move upon rotation of said bearing bolt to thereby change the position of said cutting body.

32. The tool of claim 31, wherein said plate seat is defined only by a base support surface and a back-pressure support surface arranged at an angle to said base support surface, said bearing opening extending through at least one of said base support surface and said back-pressure support surface.

33. The tool of claim 30, wherein said bearing opening extends through said tool holder such that said eccentric bolt is adjustable from an exterior of said tool holder.

34. The tool of claim 30, wherein said bearing bolt has an annular insertion groove and is movable in a longitudinal direction of said bearing opening, further comprising a pin arranged to pass into said annular insertion groove and thereby limit movement of said bearing bolt.

35. The tool of claim 30, wherein said sliding pin is arranged on one end of said bearing bolt and said bearing bolt includes a recess at an opposite end adapted to mate with a tool to thereby enable displacement of said bearing bolt.

36. The tool of claim 30, wherein said bearing bolt is threaded and said bearing opening has an internal thread corresponding to the thread of said bearing bolt.

37. The tool of claim 36, wherein said bearing bolt has an annular insertion groove and is movable in a longitudinal direction of said bearing opening upon rotation of said eccentric bolt, further comprising a pin arranged to pass into said annular insertion groove and thereby limit movement of said bearing bolt, said annular insertion groove having a width larger than a diameter of said pin.

38. The tool of claim 30, wherein said sliding pin has a diameter equal to a width of said groove.

39. A side or circular milling cutter, comprising:
a tool holder having a plurality of bearing openings and a plurality of plate seats, each of said plate seats being defined only by a base support surface and a back-pressure support surface arranged at an angle to said base support surface, each of said bearing openings extending through at least said back-pressure support surface of a respective one of said plate seats;
a plurality of cutting bodies, each of said cutting bodies being clamped in a respective one of said plate seats of said tool holder, each of said cutting bodies including a back surface in contact with said back-pressure support surface of the respective one of said plate seats and a groove arranged in said back surface; and
eccentric bolts each arranged in a respective one of said bearing openings of said tool holder and including a rotatable bearing bolt and a sliding pin, said sliding pin being arranged eccentrically and parallel to an axis of rotation of said bearing bolt, said sliding pin being arranged at least partially in said groove and to move upon rotation of said bearing bolt to thereby change a position of said cutting body.

40. The milling cutter of claim 39, wherein said sliding pin has a diameter equal to a width of said groove.

41. The milling cutter of claim 39, comprising clamping means for clamping each of said cutting bodies in the respective one of said plate seats of said tool holder.

42. The milling cutter of claim 41, wherein said clamping means each comprise a clamping shoe arranged to engage the respective one of said cutting bodies and a clamping screw for attaching said clamping shoe to said tool holder.

43. The milling cutter of claim 42, wherein said clamping screws are arranged such that an axis of said clamping screws is directed obliquely inward into said tool holder.

* * * * *